(12) United States Patent
McGinnis et al.

(10) Patent No.: US 9,463,422 B2
(45) Date of Patent: Oct. 11, 2016

(54) FORWARD OSMOSIS MEMBRANES

(71) Applicant: OASYS WATER, INC., Boston, MA (US)

(72) Inventors: Robert L. McGinnis, Coventry, CT (US); Gary McGurgan, St. Louis Park, MN (US)

(73) Assignee: Oasys Water, Inc., Boston, MA (US)

( * ) Notice: Subject to any disclaimer, the term of this patent is extended or adjusted under 35 U.S.C. 154(b) by 390 days.

(21) Appl. No.: 13/797,166

(22) Filed: Mar. 12, 2013

(65) Prior Publication Data

US 2014/0054215 A1 Feb. 27, 2014

Related U.S. Application Data (63) Continuation of application No. 13/448,962, filed on Apr. 17, 2012, now Pat. No. 8,460,554, which is a continuation of application No. 12/862,584, filed on Aug. 24, 2010, now Pat. No. 8,181,794.

(60) Provisional application No. 61/291,430, filed on Dec. 31, 2009, provisional application No. 61/253,786, filed on Oct. 21, 2009, provisional application No. 61/236,441, filed on Aug. 24, 2009.

(51) Int. Cl.

| | |
|---|---|
| *B01D 71/64* | (2006.01) |
| *B01D 61/02* | (2006.01) |
| *B01D 61/00* | (2006.01) |
| *B01D 67/00* | (2006.01) |
| *B01D 69/10* | (2006.01) |
| *B01D 69/12* | (2006.01) |
| *B01D 71/54* | (2006.01) |
| *B01D 71/56* | (2006.01) |
| *B01D 71/80* | (2006.01) |
| *C02F 1/44* | (2006.01) |
| *C02F 103/08* | (2006.01) |

(52) U.S. Cl.
CPC ............ *B01D 71/64* (2013.01); *B01D 61/002* (2013.01); *B01D 67/0009* (2013.01); *B01D 67/0086* (2013.01); *B01D 69/105* (2013.01); *B01D 69/12* (2013.01); *B01D 71/54* (2013.01); *B01D 71/56* (2013.01); *B01D 71/80* (2013.01); *C02F 1/445* (2013.01); *B01D 2323/42* (2013.01); *C02F 2103/08* (2013.01)

(58) Field of Classification Search
None
See application file for complete search history.

(56) References Cited

U.S. PATENT DOCUMENTS

| | | |
|---|---|---|
| 3,161,574 A | 12/1964 | Elam |
| 3,228,456 A | 1/1966 | Brown et al. |

(Continued)

FOREIGN PATENT DOCUMENTS

| | | |
|---|---|---|
| CN | 1662786 A | 8/2005 |
| EP | 1044719 A1 | 10/2000 |

(Continued)

OTHER PUBLICATIONS

Vilakati et al, "Relating thin film composite membranes performance to support membrane morphology . . . ", journal of membrane science, 469 (2014) 2116-224.*

(Continued)

*Primary Examiner* — Krishnan S Menon
(74) *Attorney, Agent, or Firm* — Lando & Anastasi, LLP (57) ABSTRACT

Forward osmosis membranes include an active layer and a thin support layer. A bilayer substrate including a removable backing layer may allow forward osmosis membranes with reduced supporting layer thickness to be processed on existing manufacturing lines.

9 Claims, 6 Drawing Sheets

(56) References Cited

U.S. PATENT DOCUMENTS

| | | | |
|---|---|---|---|
| 3,277,959 A | 10/1966 | Withers | |
| 3,537,935 A | 11/1970 | Withers | |
| 3,686,116 A | 8/1972 | Rio | |
| 3,709,841 A | 1/1973 | Quentin | |
| 4,026,977 A | 5/1977 | Bourganel | |
| 4,174,987 A | 11/1979 | Belvin et al. | |
| 4,216,820 A | 8/1980 | Andrew | |
| 4,411,310 A | 10/1983 | Perry et al. | |
| 4,476,024 A | 10/1984 | Cheng | |
| 4,545,862 A | 10/1985 | Gore et al. | |
| 4,585,523 A | 4/1986 | Giddings | |
| 4,629,563 A | 12/1986 | Wrasidlo | |
| 4,670,146 A | 6/1987 | Inoue et al. | |
| 4,707,265 A * | 11/1987 | Barnes et al. | 210/638 |
| 4,728,394 A | 3/1988 | Shinjou et al. | |
| 4,767,544 A | 8/1988 | Hamblin | |
| 4,795,559 A | 1/1989 | Shinjou et al. | |
| 4,802,982 A * | 2/1989 | Lien | 210/247 |
| 4,842,049 A | 6/1989 | Dodds | |
| 4,933,083 A * | 6/1990 | Jones, Jr. | 210/490 |
| 5,160,046 A | 11/1992 | Pasternak | |
| 5,171,445 A | 12/1992 | Zepf | |
| 5,286,280 A | 2/1994 | Chiou | |
| 5,498,278 A | 3/1996 | Edlund | |
| 5,645,626 A | 7/1997 | Edlund et al. | |
| 5,702,503 A | 12/1997 | Tse Tang | |
| 5,869,174 A | 2/1999 | Wang | |
| 6,131,649 A | 10/2000 | Pearl et al. | |
| 6,165,363 A | 12/2000 | Oishi et al. | |
| 6,207,053 B1 | 3/2001 | Carroll et al. | |
| 6,409,921 B1 | 6/2002 | Muller et al. | |
| 6,423,205 B1 | 7/2002 | Akahori et al. | |
| 6,486,240 B1 | 11/2002 | Won et al. | |
| 6,495,043 B1 | 12/2002 | Heijnen | |
| 6,547,000 B1 | 4/2003 | Rantala et al. | |
| 6,673,242 B1 | 1/2004 | Herron | |
| 6,753,055 B2 | 6/2004 | Stevens et al. | |
| 6,902,672 B2 | 6/2005 | Herron | |
| 7,152,670 B2 | 12/2006 | Dobbs et al. | |
| 7,445,712 B2 | 11/2008 | Herron | |
| 7,566,402 B2 | 7/2009 | Thorsen et al. | |
| 7,591,933 B2 | 9/2009 | Grebenyuk et al. | |
| 8,181,794 B2 | 5/2012 | McGinnis et al. | |
| 2002/0056535 A1 | 5/2002 | Hama et al. | |
| 2003/0159980 A1 * | 8/2003 | Barss et al. | 210/321.8 |
| 2005/0006301 A1 | 1/2005 | Angelini et al. | |
| 2005/0011359 A1 | 1/2005 | Pan et al. | |
| 2005/0077243 A1 | 4/2005 | Pinnau et al. | |
| 2006/0043013 A1 | 3/2006 | Hiro et al. | |
| 2006/0226067 A1 | 10/2006 | Herron | |
| 2007/0251883 A1 | 11/2007 | Niu | |
| 2008/0149561 A1 | 6/2008 | Chu et al. | |
| 2008/0312349 A1 | 12/2008 | Yeager et al. | |
| 2009/0078640 A1 | 3/2009 | Chu et al. | |
| 2010/0285101 A1 | 11/2010 | Moore et al. | |

FOREIGN PATENT DOCUMENTS

| | | |
|---|---|---|
| WO | 97/33681 A1 | 9/1997 |
| WO | 03047733 A1 | 6/2003 |
| WO | 2006049663 A1 | 5/2006 |
| WO | 2008137082 A1 | 11/2008 |
| WO | 2011060202 A1 | 5/2011 |
| WO | 2011069050 A1 | 6/2011 |

OTHER PUBLICATIONS

Achilli et al. "The Forward Osmosis Membrane Bioreactor: A Low Fouling Alternative to MBR Processes". Desalination 239 (2009) 10-21.

Bamaga et al. "Hybrid FO/RO Desalination System: Preliminary Assesment of Osmotic Energy Recovery and Designs of New FO Membrane Module Configurations". Desalination 268 (2011) pp. 163-169.

Chou et al. "Characteristics and Potential Applications of a Novel Forward Osmosis Hollow Fiber Membrane". Desalination Journal. © 2010 Elsevier B.V.

Ghosh et al. "Impacts of Support Membrane Structure and Chemistry on Polyamide-Polysulfone Interfacial Composite Membranes". Journal of Membrane Science 336 (2009) pp. 140-148.

Gray et al. "Internal Concentration Polarization in Forward Osmosis: Role of Membrane Orientation". Desalination 197 (2006) pp. 1-8.

Lay et al. "Study of Integration of Forward Osmosis and Biological Process: Membrane Performance Under Elevated Salt Environment". Desalination Journal. © 2011 Elsevier B.V.

Lee et al. "Comparison of Fouling Behavior in Forward Osmosis (FO) and Reverse Osmosis (RO)". Journal of Membrane Science. © 2010 Elsevier B.V.

Loeb et al. "Effect of Porous Support Fabric on Osmosis Through a Loeb-Sourirajan Type Asymmetric Membrane". Journal of Membrane Science 129 (1997) pp. 243-249.

McCutcheon et al. "Influence of Concentrative and Dilutive Internal Concentration Polarization on Flux Behavior in Forward Osmosis". Journal of Membrane Science 284 (2006) pp. 237-247.

McCutcheon et al. "Influence of Membrane Support Layer Hydrophobicity on Water Flux in Osmotically Driven Membrane Processes". Journal of Membrane Science 318 (2008) pp. 458-466.

Mehta et al. "Internal Polarization in the Porous Substructure of a Semipermeable Membrane Under Pressure-Retarded Osmosis". Journal of Membrane Science 4 (1978) pp. 261-265.

Mehta et al. "Performance of Permasep B-9 and B-10 Membranes in Various Osmotic Regions and at High Osmotic Pressures". Journal of Membrane Science 4, (1979) pp. 335-349.

Mehta, Gurmukh. "Further Results on the Performance of Present-Day Osmotic Membranes in Various Osmotic Regions". Journal of Membrane Science 10 (1982) pp. 3-19.

Ng et al. "Performance of Forward (Direct) Osmosis Process: Membrane Structure and Transport Phenomenon". Environ. Sci. Technol. 2006, 40, pp. 2408-2413.

Sairam et al. "Method for the Preparation of Cellulose Acetate Flat Sheet Composite Membranes for Forward Osmosis—Desalination using MgSO4 Draw Solution". Desalination 273 (2011) 299-307. © 2011 Elsevier B.V.

Tang et al. "Concentration of Brine by Forward Osmosis: Performance and Influence of Membrane Structure". Desalination 224 (2008) pp. 143-153.

Tang et al. "Modeling Double-Skinned FO Membranes". Desalination 283 pp. 178-186. © 2011 Elsevier B.V.

Yip et al. "Thin-Film Composite Pressure Retarded Osmosis Membranes for Sustainable Power Generation from Salinity Gradients". Environmental Science & Technology. Apr. 14, 2011.

\* cited by examiner

FORWARD OSMOSIS MEMBRANES

CROSS REFERENCE TO RELATED APPLICATIONS

This application is a continuation of U.S. Pat. No. 8,460,554, issued Jun. 11, 2013, which is a continuation of U.S. Pat. No. 8,181,794, issued May 22, 2012, which claims priority under Section 119 to U.S. Provisional Application No. 61/236,441 filed on Aug. 24, 2009, U.S. Provisional Application No. 61/253,786 filed on Oct. 21, 2009, and U.S. Provisional Application No. 61/291,430 filed on Dec. 31, 2009, the entire disclosures of which are hereby incorporated herein by reference in their its entireties for all purposes.

FIELD OF THE TECHNOLOGY

One or more aspects relate generally to osmotic separation. More particularly, one or more aspects involve membranes that are useful in engineered osmotic separation processes.

BACKGROUND

Semipermeable membranes are substantially permeable to a liquid and substantially impermeable to solutes based on the nature of their selective barrier. Osmotically driven membrane separation generally relies upon driving forces associated with the passage of draw solutes through one or more support layers of a membrane used in the separation process.

Polymeric membranes used in liquid separations are typically thin-film composite (TFC) membranes which generally include a selective barrier on a porous support structure. Recent development of highly selective membranes has been focused primarily on the reverse osmosis (RO) process. Reverse osmosis is a pressure driven process in which the primary resistance to water flux through the membrane is hydrodynamic once the osmotic pressure of the solution is overcome by an excess of hydraulic pressure. Forward osmosis (FO), by contrast, is a diffusion driven process. The factors affecting water flux in RO and FO processes are different, in turn requiring different membrane structures for optimum performance.

SUMMARY

Aspects relate generally to forward osmosis membranes and methods of making forward osmosis membranes.

In accordance with one or more embodiments, a method of making a forward osmosis membrane may comprise providing a support structure including at least a first layer and a second layer, applying a material to a first layer of the support structure to form a membrane support layer, applying a barrier material to the membrane support layer to form the forward osmosis membrane, and releasing the forward osmosis membrane by separating the first layer of the support structure from the second layer of the support structure.

In some embodiments, the support structure may comprise a bilayer structure. The first layer of the support structure may have a Frazier air permeability of greater than about 50 cfm/ft² min. The material applied to the first layer of the support structure may be applied in a coating of between about 5 and 20 g/m². The forward osmosis membrane may have an overall thickness of less than about 125 microns. The barrier material may comprise a semi-permeable material. In at least one embodiment, the barrier material may comprise a polymer. In some nonlimiting embodiments, the barrier material may comprise a polyamide urea, polypiperazine, or a block co-polymer. The support structure may comprise a polymeric paper. The support structure may comprise PET or polypropylene.

In some embodiments, the method may further comprise rewetting the forward osmosis membrane. The method may also further comprise adding an additive to one or more layers of the membrane. In at least some embodiments, the step of releasing the forward osmosis membrane by separating the first and second layers of the support structure may comprise modifying a pore structure in at least a section of the forward osmosis membrane. The method may further comprise reusing the second layer of the support structure.

In accordance with one or more embodiments, a method of making a forward osmosis membrane may comprise casting a paperless support structure on a fabrication belt or drum, depositing a barrier material on the paperless support structure, and delaminating the paperless support structure from the fabrication belt to form the forward osmosis membrane.

In some embodiments, the belt or drum may be constructed and arranged to provide a surface which retains a portion of the support structure. Retained support structure may be removed prior to full rotation of the belt or drum.

In accordance with one or more embodiments, a method of facilitating a forward osmosis separation operation may comprise providing a support structure, applying a material to the support structure to form a membrane support layer, applying a barrier layer to the membrane support layer to form a forward osmosis membrane, and configuring the forward osmosis membrane in a forward osmosis membrane module such that the support structure may provide a spacer or a flow channel for a draw solution or a feed solution supplied to the module during the forward osmosis separation operation.

In some embodiments, providing the support structure may comprise providing a bilayer structure. The method may further comprise providing a source of the draw solution.

In accordance with one or more non-limiting embodiments, a forward osmosis membrane may comprise a fabric layer of less than about 75 microns, a support layer of less than about 50 microns applied on the fabric layer, and a barrier layer applied on the support layer. The forward osmosis membrane may have an overall thickness of less than about 125 microns.

In some embodiments, the barrier layer may comprise polyamide. The support layer may comprise PET. The support layer may contain less than about 30 g/m² of material overall. The supporting material may be applied in a coating of between about 8 and 17.5 g/m². The combined weight of the support layer, support material, and barrier layer overall may be between about 20 and 40 g/m². The support layer may be made in a wet laid process.

In some embodiments, a method may comprise rewetting a forward osmosis membrane by immersion in water containing a solute which enhances wetting. The solute may be a surfactant. In other embodiments, the method may further comprise rewetting the membrane by immersion in water containing a low surface tension solvent. The solvent may comprise an alcohol. In some embodiments, the solvent may comprise isopropyl alcohol, ethanol or methanol. In at least one embodiment, the support structure is embedded within the hydrophilic material. In some embodiments, the barrier material comprises polyamide.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. The figures are provided for the purposes of illustration and explanation and are not intended as a definition of the limits of the invention. In the figures.

DETAILED DESCRIPTION

Osmotic separation processes generally involve generating water flux across a semi-permeable membrane based on osmotic pressure differentials. Solute may be rejected by the membrane and retained on either side due to the greater permeability of water than the solute with respect to the selective barrier of the membrane. Solutes may be undesirable and therefore removed from a process stream via membrane separation for purification, or desirable in which case they may be concentrated and collected via a membrane separation process.

Membranes may be used in various osmotically driven separation processes such as but not limited to desalination, wastewater purification and reuse, FO or PRO bioreactors, concentration or dewatering of various liquid streams, concentration in pharmaceutical and food-grade applications, PRO energy generation and energy generation via an osmotic heat engine.

Polymeric membranes typically include a porous support structure that provides mechanical and structural support for a selective layer. Membranes may be formed in various shapes including spiral wound, hollow fiber, tubular and flat sheet depending on an intended application. Membrane characteristics should be customized to achieve ideal performance and may vary between specific applications. For example, in FO and PRO applications, the effectiveness of a separation process may be enhanced by reducing the thickness and tortuosity of the membrane, while increasing its porosity and hydrophilicity, without sacrificing strength, salt rejection and water permeability properties.

The RO membrane industry has, to date, standardized on a polyethylene terephthalate (PET) support layer with a polysulfone active coating. The PET support layer is generally about four mils thick with a basis weight of approximately 80 g/m$^2$ and a Frazier air permeability of approximately four cfm/ft$^2$/min. Although robust, the PET material generally represents the most expensive raw material of the membrane and provides little to no benefit to the performance of the RO membrane. When PET is used as a support structure in other osmotic separation membranes, such as for FO and pressure retarded osmosis (PRO) processes, membrane performance is significantly impeded.

Thus, reducing the thickness of the support structure may be desirable. Attempting to reduce the thickness or weight of the support material may be associated with membrane processing problems, however, such as the inability to run the support material through a membrane fabrication line without creasing or wrinkling. In severe cases, membrane web breakage can occur which may result in significant costs to a manufacturer.

In accordance with one or more embodiments, the manufacture of membranes with reduced thickness for various engineered osmotic separation processes may be facilitated. In at least some embodiments, the thickness of the membrane support structure may be reduced. Thinner support structures may be associated with reduced cost, enhanced mass transfer and higher flux within the membrane by reducing resistance to fluid flow and solute diffusion through the membrane support, and an increase in the amount of active membrane area which may be provided in a separation module. Furthermore, as water standards continue to become more stringent, reducing the thickness of the support structure may reduce the level of various residual chemicals of concern in the membranes, such as dimethylformamide and meta phenylene diamine.

In accordance with one or more embodiments, a bilayer substrate may be provided to facilitate membrane fabrication. A bilayer substrate may include a membrane support layer which will serve as the membrane support layer of a final membrane product. The membrane support layer of the bilayer substrate may be of reduced thickness compared to conventional membrane support layers while at the same time providing an overall thickness requisite for membrane manufacturing, including the application and processing of a selective layer upon the support layer. In some embodiments, the bilayer support may include a removable backing layer in addition to the membrane support layer to provide the extra thickness. The removable backing layer may be intended to be separated from the support layer subsequent to membrane fabrication. In other embodiments, the bilayer substrate may include a backing layer intended to remain intact subsequent to membrane fabrication. In at least some embodiments, the backing layer may remain connected to the support layer and incorporated into a membrane module.

In accordance with one or more embodiments, a bilayer substrate may include a membrane support layer generally affixed to a removable backing layer. The membrane support layer may be the support layer of a resultant membrane while the removable backing layer may be largely sacrificial, temporarily providing increased thickness to the support layer to facilitate membrane processing. The membrane support layer of the bilayer substrate may generally be a light basis weight layer of reduced thickness in comparison to a conventional membrane support layer. In at least one embodiment, the support layer may be PET. In some embodiments, the support layer and backing layer may be made of the same material. In other embodiments, they may be made of different materials. The bilayer substrate may be characterized by properties which allow the two layers together to perform similar to an existing standard PET support layer with respect to strength, resistance to creasing, and general processing in the membrane manufacturing process.

In some nonlimiting embodiments, the backing layer may typically be about two to about four mils in thickness with a Frazier air permeability of less than about 6 cfm/ft$^2$ min.

The top layer, which may ultimately be the membrane support structure as described herein, may typically be less than about 2 mils in thickness with a Frazier air permeability of greater than about 100 cfm/ft$^2$ min. The forward osmosis membrane may have an overall thickness of less than about 125 microns. The support layer may contain less than about 30 g/m$^2$ of material overall. The supporting material may be applied in a coating of between about 8 and 17.5 g/m$^2$. The combined weight of the support layer, support material, and barrier layer overall may be between about 20 and 40 g/m$^2$. The top support layer may be made in a wet laid process, dry laid process, or a woven material. Alternately, the support layer may be made by deposition in the presence of an electrical field, such as in an electrospinning method. Materials may include PET or other polymers typically used in the fabrication of pressure driven membrane supports, and may additionally be designed to have a hydrophilic nature. In some embodiments, the support structure may be a paper, such as a polymeric paper. In some nonlimiting embodiments, the support material may be made of PET, polypropylene, polysulfone, polyacrylonitrile, or other porous polymers suitable for creating a support for interfacial polymerization of a polyamide, polyamide urea, or similar type barrier layer. Hydrophilic additives may be introduced to the support material.

A selective or otherwise active layer may be applied to the support material of the bilayer substrate during a membrane manufacturing process. In some embodiments, a semi-permeable layer may be applied as the active layer. The semipermeable layer may comprise a polymer. In certain embodiments, the semipermeable layer may comprise a polyamide, such as polyamide urea, a block co-polymer or polypiperazine. In some nonlimiting embodiments, a polysulfone layer may be applied to a PET support layer of a bilayer substrate. Multi-layered substrates in accordance with one or more embodiments may be easier to coat than single layer since the substrate is sturdier and thicker and thereby less subject to wrinkling and tearing. Subsequent to membrane processing, the backing layer may then be separated and removed. By using the bilayer substrate, a membrane with a support layer of reduced thickness may be produced using standard manufacturing equipment and techniques. In some embodiments, the separation step may be performed prior to application of an active layer.

In accordance with one or more embodiments, disclosed methods may be characterized by minimal penetration of active material, such as polysulfone, into the backing layer which may facilitate separation and removal of the backing layer. Without wishing to be limited to any particular theory, the use of multiple layers may mitigate the impact of strike-through by blocking excess coating material from penetrating the backing layer. As such, the backing layer may remain largely intact subsequent to separation, enabling reuse or recycling of the backing layer which may offer additional efficiencies and cost savings. In other embodiments, the backing layer may be largely sacrificial. In other embodiments, the backing layer may be recycled within the fabrication equipment itself, such as with a rotating belt or drum. In some embodiments, the backing layer or belt may allow sufficient penetration of the support material so that upon removal of the backing material, beneficial disruption of the pore structure of the support material occurs. This may cause the base of the porous support material to have a more open and porous structure than it would have had without this disruption. Optimal backing layer characteristics may allow for slight penetration of the porous support material, without allowing complete penetration, or "strike through", such that when the backing layer is removed, the pore structure is opened up without causing defects in the barrier layer above it.

One or more embodiments may find applicability in the manufacture of membranes for FO and PRO processes, as well as offer benefits for the manufacture of membranes used in pressure driven separations such as RO, microfiltration (MF), ultrafiltration (UF) and nanofiltration (NF).

In at least some embodiments, a bilayer substrate may be formed by casting a support polymer on a substantially high release material such that after casting an active barrier layer on the support polymer, the support polymer may be peeled from the base material such that only support polymer and the active membrane coating remain. In other embodiments, a bilayer material may be commercially purchased for use in a membrane manufacturing process.

In accordance with one or more embodiments, the removal of a sacrificial or recyclable backing layer may create a more open pore structure at a base region of the polymer support layer which previously interfaced with the backing layer prior to removal thereof. This may result in enhanced flux through the membrane. The tearing or other disruption of a relatively closed pore structure at the bottommost section of the porous polymer support may produce a structure characterized by significantly enhancing the porosity and reducing the tortuosity of the support structure. In many cases, the pore structure of such a polymeric support will be substantially open through most of its thickness, but become closed at the point where the polymer phase interacted with the base material. If some of the porous support penetrates into the base layer, removing this layer may expose a much more open structure as would be found throughout the porous layer, removing the tight layer at the base.

In accordance with one or more further embodiments, rather than using a bilayer substrate which includes a sacrificial or otherwise removable backing layer, a bilayer substrate may be implemented which is intended to wholly become part of a resultant membrane. In these embodiments, a support polymer may be casted directly onto one or both sides of a tricot-type mesh support material. A polyurethane or other adhesive may be used to bind the support layer to the mesh layer. The support polymer may be PET in certain non-limiting embodiments. The mesh support, such as a supporting tricot, may conduct fluid flow within a finished membrane module. A membrane barrier layer may then be applied on one or both of these support polymer coatings, forming a final single or double layer membrane with a water conducting mesh as its base or core.

In some non-limiting embodiments, a tricot layer may be laminated to a thin PET layer to create a bilayer which may then be processed on existing membrane manufacturing machines. By combining these layers prior to membrane manufacture the strength of the tricot can be used to process the thin PET and the resulting bilayer material does not require separation in that the membrane including tricot may be incorporated directly into a membrane module to enhance module performance. Without wishing to be bound to any particular theory, the tricot backing may increase membrane production efficiency since it is relatively impervious to web breakage and has superior strength compared to the standard 4 mil PET. This may result in reduced creasing and wrinkling in the manufacturing process, increasing membrane performance and yields. Further production efficiencies may include reduction in fabrication steps by eliminating the need for producing leaf sets of tricot, flow spacers or permeate tubes which are traditionally separately incorporated into a completed membrane module.

In accordance with one or more embodiments, a bilayer substrate may be prewetted to improve mass transfer characteristics of the support polymer and polymer/fabric interface. A solvent such as with a solvent such as NMP, DMF, DMSO, triethyl phosphate, dimethyl acetamide, or a combination thereof may be used to prewet. Prewetting may create a more open pore structure, cause less occlusion of pores in the polymer support, enhance polymer porosity by encouraging macrovoid formation, improve pore structure and decrease tortuosity. These properties may be realized and even enhanced by separation of removable backing layer if used. These properties may be particularly desirable when using bilayer assemblies which are not intended to be separated, such as with supporting tricot mesh and PET fabric, for example, by preventing excessive penetration of the polymer into the supporting material.

In accordance with one or more embodiments, a process to manufacture a membrane for osmotically driven membrane processes may include the use of a drive system to transport a bilayer sheet of support material, for example two layers of PET paper, through a casting machine which may deposit a polymer in a solvent solution. Tensions may generally be maintained so as to reduce the possibility of creasing and wrinkling. The bilayer support material may be composed of two layers pressed together such that the bottom layer may be either subsequently removed or ultimately used as a membrane fluid channel spacer mesh.

The bilayer support material may be conveyed to a polymer application device which applies a solution of polymer, for example polysulfone, in a solvent, for example dimethylformamide. Upon coating, the bilayer material may enter a quenching bath in which the polymer precipitates into the top layer of the bilayer material. The temperature of the quenching bath may vary and may impact one or more properties of a resultant membrane. In at least some preferred nonlimiting embodiments, improved properties of forward osmosis membranes may be associated with quenching bath temperature in the range of 100° F. to 110° F. The bilayer top layer is designed to allow sufficient penetration of the solution to result in delamination pressures at which the precipitated polymer layer would disengage from the bilayer support material in excess of about ten psig. The backing layer of the bilayer material in contrast is designed to prevent polymer penetration to allow for the two support material layers to be separated after membrane manufacturing. The primary purpose of the backing layer is to prevent creasing and wrinkling of the top layer while processing by providing necessary strength to allow existing membrane machines to convey the very thin membrane required for forward osmosis membranes. The remainder of the membrane production is completed using standard rinsing and membrane casting equipment.

Any removable bilayer material implemented may be separated prior to or as part of module fabrication. The separation of the two layers can provide the additional benefit of opening the pore structure at the interface of the PET layers further enhancing separation properties. Alternately, the bottom layer of the bilayer material may be integrated into the membrane module construction serving the role of the spacer mesh, for example tricot normally integrated between membrane layers as a fluid conveyance medium.

In accordance with one or more embodiments, the selective barrier in the disclosed thin-film composite membranes may be a semipermeable three-dimensional polymer network, such as an aliphatic or aromatic polyamide, aromatic polyhydrazide, poly-bensimidazolone, polyepiamine/amide, polyepiamine/urea, polyethyleneimine/urea, sulfonated polyfurane, polybenzimidazole, polypiperazine isophtalamide, a polyether, a polyether-urea, apolyester, or a polyimide or a copolymer thereof or a mixture of any of them. In certain embodiments, the selective barrier may be an aromatic or non-aromatic polyamide, such as residues of a phthaloyl (e.g., isophthaloyl or terephthaloyl) halide, a trimesyl halide, or a mixture thereof. In another example, the polyamide may be residues of diaminobenzene, triaminobenzene, polyetherimine, piperazine or poly-piperazine or residues of a trimesoyl halide and residues of a diaminobenzene. The selective barrier may also comprise residues of trimesoyl chloride and m-phenylenediamine. Further, the selective barrier may be the reaction product of trimesoyl chloride and m-phenylenediamine.

In accordance with one or more embodiments, the selective barrier may be characterized by a thickness adequate to impart desired salt rejection and water permeability properties while generally minimizing overall membrane thickness. In certain embodiments, the selective barrier may have an average thickness from about 50 nm and about 200 nm. The thickness of the barrier layer is desired to be as limited as possible, but also thick enough to prevent defects in the coating surface. The practice of polyamide membrane formation for pressure driven semi-permeable membranes may inform the selection of the appropriate barrier membrane thickness. The selective barrier may be formed on the surface of a porous support via polymerization, for example, via interfacial polymerization.

Polymers that may be suitable for use as porous supports in accordance with one or more embodiments include polysulfone, polyethersulfone, poly(ether sulfone ketone), poly(ether ethyl ketone), poly(phthalazinone ether sulfone ketone), polyacrylonitrile, polypropylene, poly(vinyl fluoride), polyetherimide, cellulose acetate, cellulose diacetate, and cellulose triacetate polyacrylonitrile.

In accordance with one or more embodiments, the support layer may be characterized by a thickness adequate to provide support and structural stability to a membrane during manufacture and use while generally minimizing overall membrane thickness. In certain embodiments, the polymer support may have an average thickness from about 10 μm and to about 75 μm. It is generally desirable for the support to be as thin as possible without compromising the quality of the support surface for interfacial polymerization of the barrier layer. The smoother the support layer is, the less thickness of support material is generally required for this criterion. In at least some preferred embodiments, this layer is less than approximately 40 μm. In certain embodiments, the porous support comprises a first side (active side) with a first plurality of pores, and a second side (support side) with a second plurality of pores. In certain embodiments, the first plurality of pores and the second plurality of pores are fluidly connected to each other. In one embodiment, polymeric additives are dispersed within the porous support. Additives may enhance hydrophilicity, strength or other desirable properties.

In accordance with one or more embodiments, a thin-film composite membrane may include a porous support comprising a first side with a first plurality of pores, and a second side with a second plurality of pores, wherein the average diameter of substantially all of the first plurality of pores is between about 50 nm and about 500 nm, and the average diameter of substantially all of the second plurality of pores is between about 5 μm and about 50 μm. The purpose of the top layer is to allow for a high quality barrier to form by interfacial polymerization or other deposition method, and to provide mechanical support to a very thin barrier layer. The purpose of the remainder of the support structure is to be as open and as minimally tortuous as possible, while being as thin as possible. Large pores towards the bottom may facilitate this purpose.

In accordance with one or more embodiments, a polymeric additive may be dispersed in the porous support. This addition may add strength, fouling resistance, hydrophilicity, or other desirable properties to the support porous structure and materials. In the case of hydrophilic additions, very small quantities may be added. By way of example, between 0.1-1% of PVP may be added to the polysulfone to enhance hydrophilicity in the structure. A semi-permeable selective barrier may be applied on the first side of the porous support.

In certain embodiments, the membrane flux may be between about 15 and about 25 gallons per square foot per day under operating conditions of 1.5 M NaCl draw solution and a DI feed solution at 25° C. This high flux is an indication of the effectiveness of the thin, open, porous, and low tortuosity support layer in reducing resistance to diffusion of draw solutes into the membrane support structure to provide driving force for flux in the form of osmotic pressure. This high flux is due in part also to the water permeability of the barrier layer.

In accordance with one or more embodiments, a method of making a forward osmosis membrane may comprise providing a support structure including at least a first layer and a second layer, applying a material to a first layer of the support structure to form a membrane support layer, applying a barrier material to the membrane support layer to form the forward osmosis membrane, and releasing the forward osmosis membrane by separating the first layer of the support structure from the second layer of the support structure.

In accordance with one or more embodiments, a method of making a forward osmosis membrane may comprise providing a support structure including at least a thin support layer, adding a material to the support layer to form a membrane support structure, releasing the thin layer and material structure as one piece, and coating the membrane support structure with a barrier material to form the forward osmosis membrane.

In accordance with one or more embodiments, a method of facilitating a forward osmosis separation operation may comprise providing a support structure, applying a thin support layer to the support structure, applying a supporting material to the layer to form a porous membrane support structure, applying a barrier layer to the porous membrane support layer to form a forward osmosis membrane, and configuring the forward osmosis membrane in a forward osmosis membrane module such that the support structure may provide a turbulence spacer for a draw solution or a feed solution supplied to the module during the forward osmosis separation operation.

In accordance with one or more embodiments, a method of facilitating a forward osmosis separation operation may comprise providing a support structure, applying a supporting material to the structure to form a porous membrane support structure, applying a barrier layer to the porous membrane support layer to form a forward osmosis membrane, and configuring the forward osmosis membrane in a forward osmosis membrane module such that the support structure may provide a turbulence spacer for a draw solution or a feed solution supplied to the module during the forward osmosis separation operation.

In accordance with one or more embodiments, a forward osmosis membrane may comprise a fabric layer of less than about 75 microns, a support layer of less than about 50 microns applied on the fabric layer, and a barrier layer applied on the support layer. The forward osmosis membrane may have an overall thickness of less than about 125 microns. The support layer may contain less than about 30 g/m$^2$ of material overall. In some embodiments, the supporting material may be applied in a coating of between about 5 and 20 g/m$^2$. In some nonlimiting embodiments, the coating may be between about 8 and 17.5 g/m$^2$. The combined weight of the support layer, support material, and barrier layer overall may be between 20 and 40 g/m$^2$. The support layer may be made in a wet laid process.

In some embodiments, the method may comprise rewetting the forward osmosis membrane by immersion in water containing a solute which enhances wetting. The solute may be a surfactant. In other embodiments, the method may further comprise rewetting the membrane by immersion in water containing a low surface tension solvent. The solvent may comprise an alcohol. In some embodiments, the solvent may comprise isopropyl alcohol, ethanol or methanol. In at least one embodiment, the support structure is embedded within the hydrophilic material. In some embodiments, the barrier material comprises polyamide.

In accordance with one or more embodiments, a forward osmosis membrane is disclosed. In some embodiments, the membrane may be a composite, generally including an active layer in conjunction with a support layer. Other parameters such as the mass percent of polymer used, choice of solvent and/or bath temperature may impact the degree to which the support layer is rendered hydrophilic, open or porous. The active layer may generally include any material capable of rejecting or otherwise acting as a barrier to one or more target compounds present in a process stream brought into contact with the membrane. In at least one embodiment, the active layer may comprise polyamide. Other materials commonly used as membrane active layers may also be implemented.

A desired degree of cross-linking may be achieved within the active layer, such as to improve the barrier properties of the membrane. Inducing cross linking in the polyamide layer is generally desirable to improve salt rejection and overall performance. In accordance with one or more embodiments, cross-linking is achieved in a manner such that the hydrophilic materials are not reduced in their performance, and are maintained in a wet state throughout the manufacturing and treatment process. In some embodiments, hot water annealing may be used to facilitate cross-linking. In other embodiments, heat treatment may occur in one or more of the immersion steps of the membrane fabrication process, during or after the active layer deposition or formation process. In other embodiments, chemical treatment may be used. In at least one embodiment, heat drying, such as oven drying, is not used. In some such embodiments, the membranes will readily rewet by immersion in water, and in some embodiments, they will rewet by exposure to a wetting agent in conjunction with water, such that they will be substantially wet when ready for use. In some embodiments, the membranes may be characterized as having a salt rejection of at least 99% or greater. The forward osmosis membranes may generally be relatively thin and characterized by high porosity, low tortuosity and high wettability. The membranes may find use in a variety of applications including osmotic-driven water purification and filtration, desalination of seawater, purification of contaminated aqueous waste streams, separation of various aqueous streams, osmotic power generation and the like.

In accordance with one or more embodiments, a polymer or other porous membrane material may be deposited via various known techniques, such as phase inversion, on a thin woven or non woven or inorganic substrate to give a forward osmosis membrane with a very thin support structure. In some embodiments, the substrate used for membrane fabrication may include a multi-layered support. An ultrafiltration (UF) substrate may be placed on a multi-layer woven or non-woven support, such that one or more layers may be removable at the end of a membrane fabrication process prior to module construction. In at least some embodiments, the size of the pores of the substrate material may be in the UF range, for example, about 100 nm to about 1 um diameter, to facilitate proper formation of an interfacial polymerization barrier layer on its surface. In some non-limiting embodiments, deposition may include phase inversion of polymers such as polysulfone or PAN. Layers which remain connected to the UF substrate may be optimized for desirable characteristics such as high porosity, low tortuosity, thinness or other properties which enhance diffusion to the UF layer. The materials may be but need not be generally hydrophilic. In at least one embodiment, one or more layers may serve as a draw solution or feed solution spacer. In one-non-limiting embodiment, for example, a 100 nanometer layer of polyamide may be deposited on 0.5 mil layer of polysulfone on a 0.5 mil paper. In some embodiments, a barrier coated UF material may be placed, such as with phase inversion of a polymer, followed by an interfacial polymerization of a barrier layer, on a woven or non-woven support such that after the manufacturing of the membrane, the support may be removed leaving only the UF and barrier material to be used in a module. In some non-limiting embodiments, a UF layer may be deposited then coated with a barrier layer such as polyamide or polyamide urea. In at least one embodiment, the substrate may include an intentionally separable support.

This support structure may be below the polymer, partially enclosed, or fully enclosed within it. In some embodiments, interfacial polymerization or coating of a thin selecting layer which permits the passage of water but not salts may then be implemented. In other embodiments, deposition of a porous support layer on a removable material, such as delamination from a belt or other linear, mobile backing material that is used to enhance material handling in the fabrication equipment, but which is not intended to become part of the finished membrane product, may be used to create a very thin membrane support structure, such that it has no backing. A thin barrier layer may then be deposited on the surface of the paperless support. In some embodiments, the barrier layer may be deposited on the support prior to the delamination of the support from the belt. In some embodiments a polymer may be coated on the surface of the support polymer, this top layer acting as the salt rejection layer, either with or without subsequent treatment. In other embodiments, the support layer itself functions as the barrier layer, having sufficient salt rejection properties for the application to which it will be applied.

In accordance with one or more embodiments, a belt or drum may be used to facilitate casting upon thin supports. In at least one embodiment, a belt, such as a conveyor belt or like structure may be used as a substrate replacement that remains primarily within the scope of the membrane manufacturing equipment. The belt may provide support for the deposition of the support and barrier coating but may be retained and reused in the fabrication equipment rather than removed at the end and discarded or reused. In some embodiments, the belt or drum may be designed to provide a surface which retains a portion of a porous support material. The base of a porous support structure may be disrupted when it is removed from the belt or drum due to retention of part of the porous support material. Such disruption may be beneficial. Retained porous support material may be removed prior to full rotation of the belt or drum to prevent accumulation of the material or inhibition of the effectiveness of the deposition and disruption process.

In some embodiments, phase inversion of a polymer coated on or around a material intended primarily to give the polymer resistance to deformation with strain may be used to create a membrane support. For example, a very open and thin woven or non woven material may be surrounded by the polymer, rather than underneath it. Interfacial polymerization of a rejecting polymer may then be carried out on this support structure.

In accordance with one or more embodiments, a forward osmosis membrane may be a hydrophilic phase inversion membrane on a woven or non woven fabric. The hydrophilic material may be PAN in some non-limiting embodiments, alone or mixed with other monomers. The fabric layer may be of any desired thickness. In some non-limiting embodiments, the fabric may be about 25 micrometers in thickness. The forward osmosis membrane may be further characterized by polyamide interfacial polymerization on its surface. A polyamide active layer may be applied so as to result in a membrane of any desired thickness. In some non-limiting embodiments, the membrane may be approximately 25 micrometers thick. The active layer of the forward osmosis membrane may be modified to enhance rejection of draw solutes. The support film may be nonwoven and made of any material, but thinness, high porosity, low tortuosity, and hydrophilicity are generally desirable. The thickness of the support film may vary. In some embodiments, the support film may be less than about 100 micrometers, less than about 80 micrometers, less than about 50 micrometers or thinner. In at least one embodiment, a porous polyester nonwoven support film may be used as a substrate.

In accordance with one or more embodiments, a forward osmosis membrane may be formed by first creating a support layer. In some non-limiting embodiments, a thin fabric backing layer of less than about 30 micrometers may be coated with a polysulfone solution of about 12.5% in dimethylformamide. The effect of polysulfone thickness on the flux of a forward osmosis membrane is illustrated in accompanying FIG. 3. Lower concentrations of polysulfone may be used to further improve forward osmosis membrane properties, including flux, as evidenced by accompanying FIG. 1. In some embodiments, the amount of polysulfone coating may generally be less than about 16 $g/m^2$ to minimize the impact of the support layer on diffusion. The application of a support layer on a typical reverse osmosis fabric backing of about 3.9 mils in thickness may result in much less than optimal forward osmosis flux as evidenced by accompanying FIG. 2.

The resulting support layer precursor may then be immersed in room temperature water causing the phase inversion of the polymer. Immersion in temperatures greater than 90 F may be used to improve the pore size characteristics of the support layer. This may produce a thin, microporous, open support structure with an embedded web giving the polymer strength for rolling and handling. The active layer may then be applied to the support structure. A non-limiting example of the coating of this support structure with the active layer would be the immersion of the support in a solution containing polyamide or other desired active material. In one non-limiting embodiment, the support structure may be immersed in a 3.4% solution of 1-3 phenylenediamine in room temperature water. The concentration of the solution may vary based on desired characteristics of the applied active layer. Duration of immersion may also vary. In some non-limiting embodiments, the duration may be less than about 5 minutes. In one specific embodiment, the duration of immersion may be about 2 minutes. Excess solution from the surface of the membrane may be removed, for example with a roller or air knife.

The membrane may then be briefly immersed in another solution to induce the polymerization of the polyamide rejecting layer by combination of the diamine in the aqueous phase and, for example, acid chloride in the non-aqueous phase, at the surface of the support material where the phases meet. In some non-limiting embodiments, the membrane may be immersed in the solution for about 2 minutes. In one non-limiting embodiment, a 0.15% solution of 98% 3,5 benzenetricarbonyltrichloride in Isopar® C or G at room temperature may be used. The membrane may then removed and the Isopar® allowed to evaporate from the membrane for a period of time, for example less than about 5 minutes. In some embodiments, the duration of the evaporation step may be about 2 minutes. In some embodiments, immersion may take the form of a dip coating process, such as one in which substantially only the surface of the membrane comes into contact with a solution. In other embodiments, the entire membrane may be submerged in the bath. In some embodiments, a combination of these techniques may be used, such as in a sequence of different immersion steps.

In accordance with one or more embodiments, a forward osmosis composite membrane may be heat treated to condition the rejecting layer so as to cause cross-linking, which may be referred to as annealing. Drying out the membrane, however, may in some cases cause detrimental shrinking of the void and pore structure. In accordance with one or more embodiments, conditioning may be achieved by a wet annealing step, for example, immersion in a hot water immersion bath. Any temperature water bath may be used that is capable of resulting in a desired degree of cross-linking and desired membrane performance, for example in terms of salt rejection. In some embodiments, as low of a temperature as possible may be desirable. In some non-limiting embodiments, a water bath below about 100° C. may be used. In one specific non-limiting embodiment, a 95° C. water bath may be used. Duration in the water bath may also be in line with requirements to achieve the desired degree of cross-linking. In one specific embodiment, the hot water bath immersion occurs for 2 minutes.

In other embodiments, the heat treatment of the membrane may occur in any or several immersion steps intended for other purposes, such as during or after the active layer polymerization or deposition step.

In other embodiments, the heat treatment of the membrane may be done in a drying step, preceded by a solvent exchange involving a solvent with a lower surface tension than water being exchanged with water by immersion. In this way, the membrane properties may not be adversely affected and the membrane may retain the properties of being readily rewet.

In other embodiments, the treatment of the rejecting layer may be carried out by a chemical treatment rather than a heating step, in which case the membrane would be kept wet throughout the treatment process.

In some embodiments, treating the membrane support layer with the polyamide material to induce crosslinking in the polyamide layer to form the forward osmosis membrane comprises chemical treatment. In other embodiments, the treatment step involves hot water immersion, and this may be referred to as wet annealing. In other embodiments, the heat treatment occurs at any point during or after the polyamide phase inversion process, by maintaining a sufficient temperature in one or more immersion steps. In other embodiments, the crosslinking is carried out by dry annealing, but this is done after a solvent exchange step, soaking the wet membrane in a solution comprising another solvent with a lower vapor pressure, so that "dry annealing" may be carried out without adversely affecting the membrane by such drying.

In accordance with one or more embodiments, a method of making a forward osmosis membrane may comprise providing a thin woven or non-woven fabric backing of less than about 50 micrometers in thickness. A support layer and a barrier layer may be applied to the fabric backing. The thin woven or non-woven fabric support layer (top layer) may be characterized by a Frazier air permeability of greater than about 100 $ft^3/ft^2$/min. The thin woven or non-woven fabric backing layer (bottom layer) may be characterized by a Frazier air permeability of less than about 10 $ft^3/ft^2$/min. In some non-limiting embodiments, a Frazier air permeability of about 5 $ft^3/ft^2$/min for the bottom layer may be desirable. In at least some embodiments, the thin woven or non-woven fabric backing may be of less than about 30 $g/m^2$ basis weight. The support layer applied to the fabric backing may be less than about 40 micrometers in thickness. The barrier layer may be applied to the polymeric support layer.

In some embodiments, a fabric backing layer and a support layer may be provided using a polysulfone concentration of less than about 13%. In certain non-limiting embodiments, the support structure may be modified with a process quench temperature greater than about 95° F. The support layer of the forward osmosis membrane may also be modified using a solution with a hydrophilic agent, for example, polyvinylpyrrolidone.

In accordance with one or more non-limiting embodiments, a forward osmosis membrane may comprise a fabric backing, a support layer of less than about 16 $g/m^{2o}$ f polysulfone or polyacrilonitrile, and a barrier layer.

In accordance with one or more embodiments, a forward osmosis membrane may be characterized by a flux of greater than about 20 gfd using 1.5M NaCl draw solution and deionized feed water at 25° C.

In accordance with one or more embodiments, a forward osmosis membrane may be characterized by a salt rejection of greater than about 99% using 1.5M NaCl draw solution and deionized feed water.

In accordance with one or more embodiments, a polysulfone solution of less that about 13% may be applied to enhance one or more properties of a forward osmosis membrane. For example, in some non-limiting embodiments, less than about 16 $g/m^2$ of polysulfone may be applied on a fabric backing layer of a forward osmosis membrane.

In accordance with one or more embodiments, a method of making a forward osmosis membrane may comprise providing a support structure, applying a hydrophilic material to the support structure to form a membrane support layer, applying a polyamide material to the membrane support layer, immersing the membrane support layer with the applied polyamide material in water, carrying out a solvent exchange by immersion of the membrane, and dry annealing the membrane support layer with the polyamide material to form the forward osmosis membrane.

In accordance with one or more embodiments, a forward osmosis membrane may be processed on production lines currently used in the manufacture of reverse osmosis, membranes.

In accordance with one or more embodiments the method by which a thin forward osmosis membrane is processed may include the use of an integrated drive system to control tension in discrete sections of a machine. Supplemental manual or automated web steering devices may also be implemented. In some embodiments, machine design may allow for no more than about a 10% tension drop per zone to reduce over tensioning of the membrane which may lead to creasing and folding over of the membrane. Membrane tensions of less than about 1 pound per linear inch may prevent creasing of the membrane. The design of the machine may also generally limit the free span of unsupported membrane to less than one half the web width in areas in which the membrane is submersed. In some non-limiting embodiments, machine design may also include optical alignment at a tolerance of about 0.001 inches per linear foot of roller width to prevent creasing and folding over of the membrane.

In accordance with one or more embodiments, various techniques disclosed herein may be used to make membranes for forward osmosis applications. In accordance with one or more embodiments, various techniques disclosed herein may also be used to make membranes for applications involving pressure retarded osmosis. In some embodiments, pressure retarded osmosis may generally relate to deriving osmotic power or salinity gradient energy from a salt concentration difference between two solutions, such as a concentrated draw solution and a dilute working fluid. Within pressure retarded osmosis, a draw solution may be introduced into a pressure chamber on a first side of a membrane. In some embodiments, at least a portion of the draw solution may be pressurized based on an osmotic pressure difference between the draw solution and a dilute working fluid. The dilute working fluid may be introduced on a second side of the membrane. The dilute working fluid may generally move across the membrane via osmosis, thus increasing the volume on the pressurized draw solution side of the membrane. As the pressure is compensated, a turbine may be spun to generate electricity. A resulting dilute draw solution may then be processed, such as separated, for reuse. In some embodiments, a lower-temperature heat source, such as industrial waste heat may be used in or facilitate a pressure retarded osmosis system or process.

The function and advantages of these and other embodiments will be more fully understood from the following example. The example is intended to be illustrative in nature and is not to be considered as limiting the scope of the systems and methods discussed herein.

EXAMPLE

The disclosed approaches have been demonstrated on an existing 40 inch membrane production machine with 1.7 mil top PET alone or with 2.3 mil backing material which is later removed. Techniques using a single layer support are generally referred to herein as Gen 1, while techniques using a bilayer approach are generally referred to herein as Gen 2.

Figure 1:
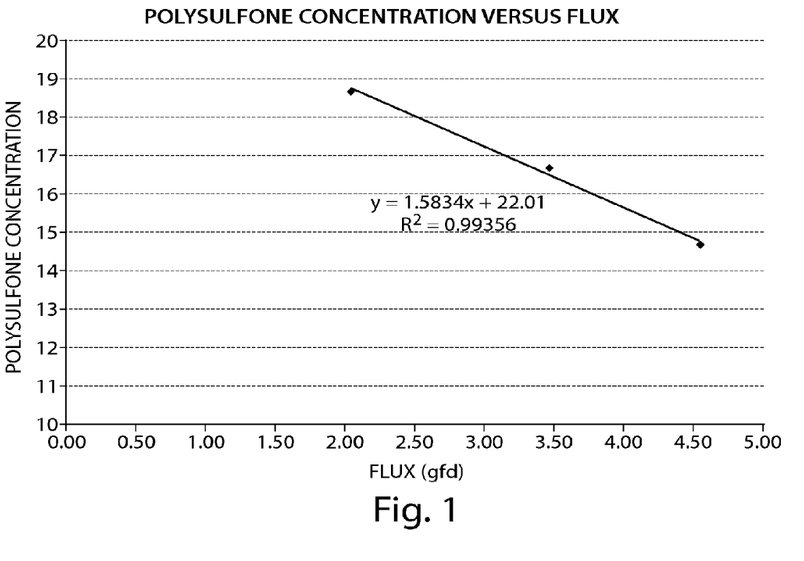
FIGS. 1-6 present data referenced in the accompanying Example.

FIG. 1 presents flux data as a function of polysulfone concentration. Flux was measured at various polysulfone concentrations with other parameters remaining constant. In accordance with a substantially inverse relationship, flux increased as polysulfone concentration decreased. Experimental data has shown improved forward osmosis membrane flux with polysulfone concentrations in the range of about 9% to about 13%. Membranes used were Gen 1, but with a thicker 4 mil PET.

Figure 2:
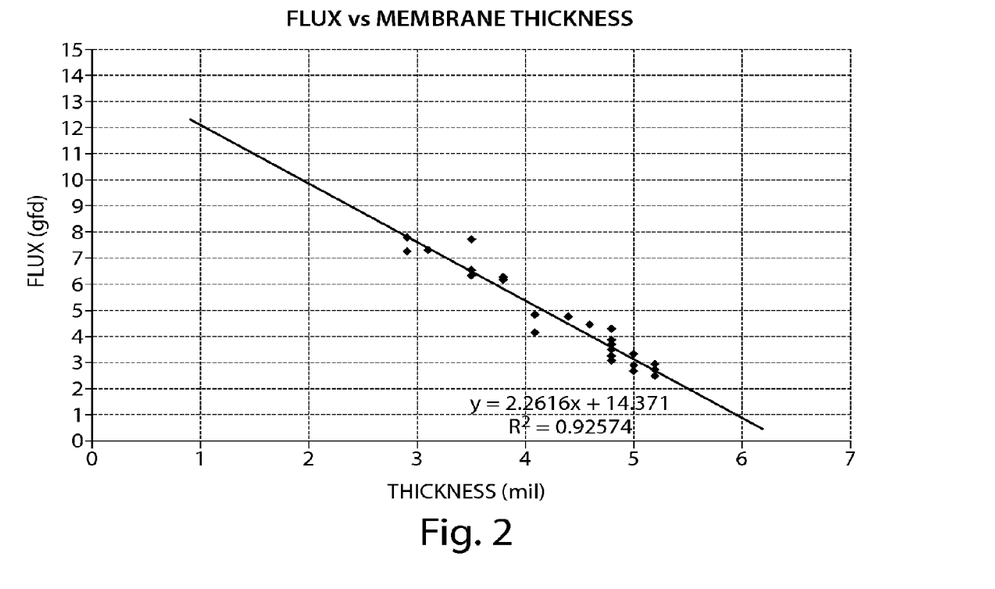

FIG. 2 presents data indicating an inverse relationship between membrane thickness and flux. Flux decreased with increasing membrane thickness, generally indicating the desirability of thin membranes. Other parameters were kept constant. Flux was also measured for various polysulfone loadings with other parameters remaining constant. Membranes used were Gen 1.

Figure 3:
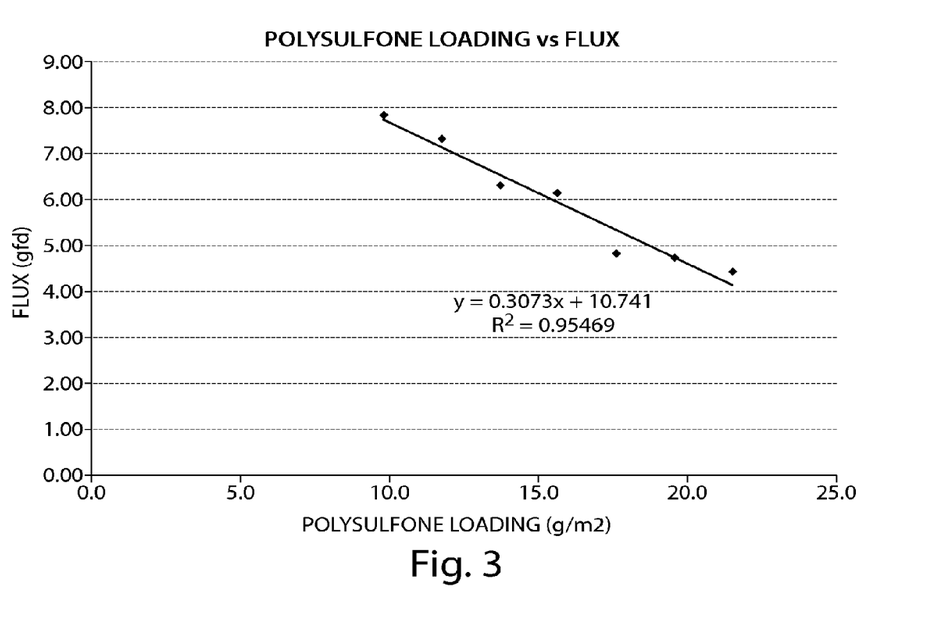

FIG. 3, consistent with FIG. 1, indicates that flux decreased with increasing polysulfone loading. Membranes used were Gen 1.

Figure 4:
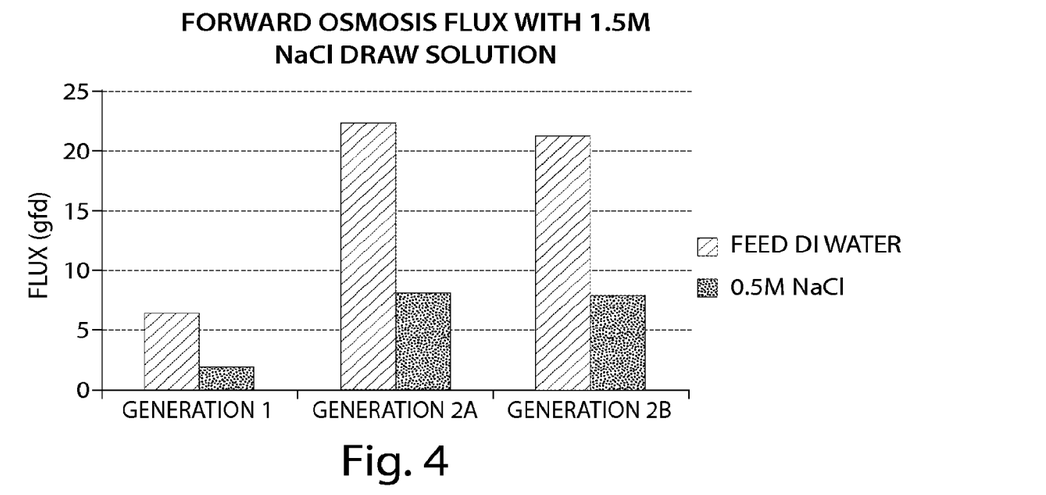

FIG. 4 depicts flux data collected using two membranes, depicted as Gen 2A and Gen 2B, both manufactured in accordance with the decreased PS (polysulfone) concentration, decreased PS loading, increased porosity, and bilayer approach disclosed herein, in comparison to flux data collected from a membrane made with a single supporting layer depicted as Gen 1, where only the benefits of decreased PS concentration, decreased PS loading, and increased porosity were employed, but no bilayer manufacturing technique. The test method involved using 1.5M NaCl draw solution on the supporting side of the membrane and either deionized water or 0.5 M NaCl solution on the feed side. Flux was measured as the mass change in the draw solution over time. As indicated, the disclosed bilayer technique was associated with superior flux results attributable to the reduced thickness and other parameters and characteristics associated with the bilayer techniques disclosed herein. In particular, all of these parameters worked together to yield a superior result. Not shown is an experimental run involving a membrane produced via the bilayer technique without decreased PS concentration, decreased PS loading, and increased porosity, which produced significantly less flux than the Gen 2A and 2B samples shown here. Also not shown is the very low flux that was produced by using a membrane made by techniques used in pressure driven semi-permeable membrane manufacturing. Conventional RO membranes in this experiment produced less than 1 GFD of flux.

Figure 5:
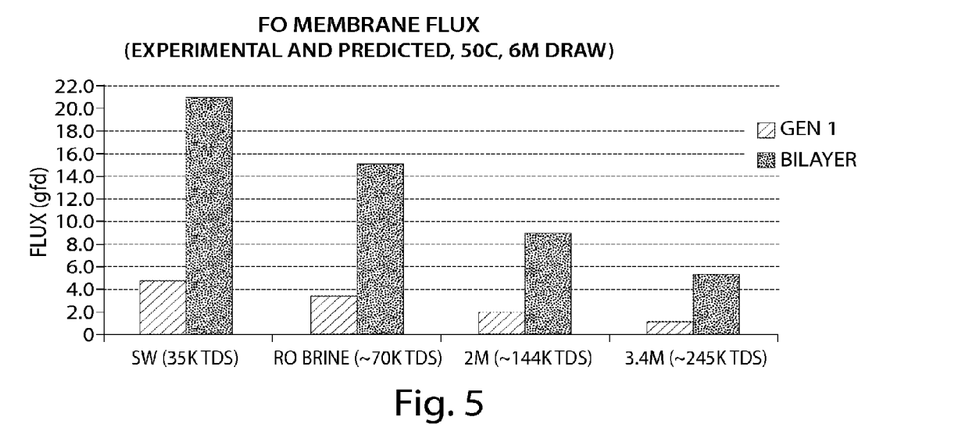

FIG. 5 depicts the flux results of a membrane made in accordance with the bilayer technique described herein in comparison to a membrane made with a single supporting layer. The membrane which produced the highest flux was manufactured by first combining two layers of PET. The top layer of PET was 1.5 mils in thickness with a basis weight of 15 grams per square meter and was combined with a backing PET with a thickness of 2.3 mils and a basis weight of 49 grams per square meter. The top thinner layer of PET was coated with a 12.5% solution of polysulfone and dimetylformamide resulting is a polysulfone coating weight of 21 grams per square meter. The described support was then processed using membrane chemistry of an acid chloride and amine to produce the forward osmosis polyamide membrane. Following the membrane formation, the bottom PET layer was removed prior to module construction. The resultant membrane and support had a basis weight of approximately 35 grams per square meter and a total thickness of 95 microns.

The test method was to use 6 M ammonium salt draw solution on the supporting side of the membrane and varying concentrations of NaCl solution on the feed side at a temperature of 50° C. Flux was measured as the mass change in the draw solution over time. As indicated, the disclosed bilayer technique was associated with superior flux results due to the reduced thickness and other parameters and characteristics associated with the bilayer technique disclosed herein. Particularly, this illustrates the capability of treating very high salinity feeds using membranes in a way that has not in the past been possible due to the benefits of the membrane manufacturing techniques described herein. The data points presented for 0.5M feed are experimental, and the remaining data represents an extrapolation using accepted modeling techniques. Not shown is the very low flux that is produced by using a membrane made by techniques used in pressure driven semi-permeable membrane manufacturing. Conventional RO membranes would produce negligible flux in the high salinity feed scenarios.

Figure 6:
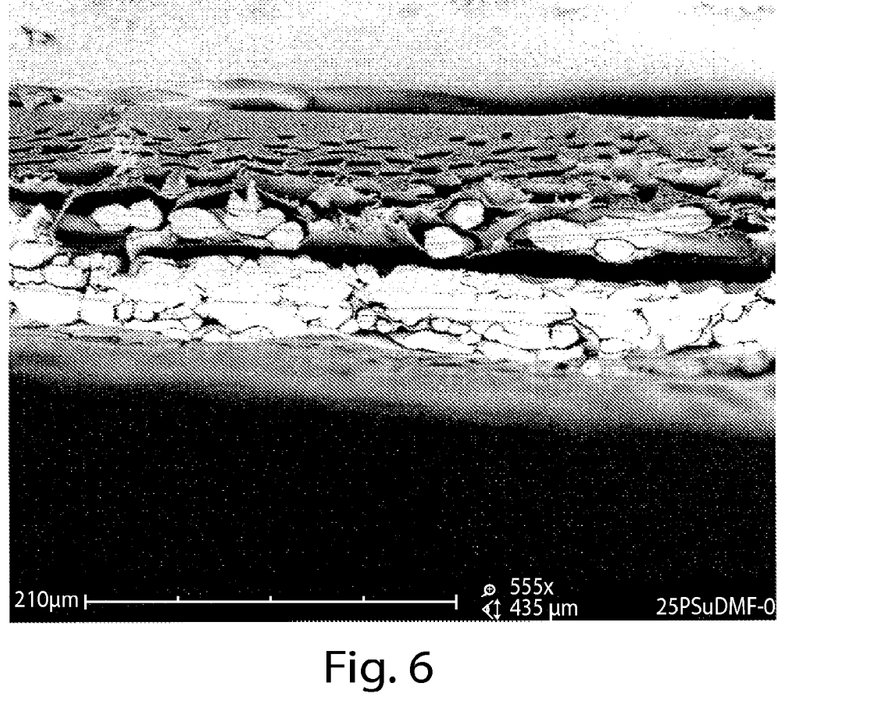

FIG. 6 presents an SEM image of a membrane manufactured in accordance with one or more bilayer techniques described herein. The pore structure is substantially open at a base region of the polymer support layer which previously interfaced with the backing layer prior to removal thereof. The polyamide barrier layer, the porous support layer, the topmost PET and backing PET are all shown.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A forward osmosis membrane, comprising:
    a support structure having a first side and a second side and comprising a polymeric material, a thickness of less than 2 mils, and a Frazier air permeability of greater than about 100 ft$^3$/ft$^2$/min;
    a membrane support layer disposed on the first side of the support structure and comprising a polymer loading of about 5 g/m$^2$ to about 20 g/m$^2$ and a thickness of less than 2 mils; and
    a selective barrier layer disposed on the membrane support layer and comprising a semipermeable, three-dimensional polymer network comprising polybenzimidazole and polyamide, the selective barrier layer having a thickness of less than 200 nm.

2. The membrane of claim 1, wherein the selective barrier layer comprises a thickness of less than 100 nm.

3. The membrane of claim 1, wherein the membrane support layer further comprises polyethersulfone.

4. The membrane of claim 1, wherein the membrane support layer further comprises a hydrophilic additive.

5. The membrane of claim 4, wherein the hydrophilic additive comprises 0.1% to 1.0% of polyvinylpyrrolidone.

6. The membrane of claim 1, wherein the membrane support layer further comprises a polymer concentration in solution of about 13%.

7. The membrane of claim 1, wherein the support structure comprises a polymeric paper.

8. The membrane of claim 7, wherein the polymeric paper comprises at least one of polyethylene terephthalate or polypropylene.

9. The membrane of claim 1, further comprising a mesh material disposed on the second side of the support structure.

* * * * *